United States Patent
Kim

Patent Number: 6,055,309
Date of Patent: *Apr. 25, 2000

[54] CIRCUIT AND METHOD FOR AUTOMATICALLY CUTTING OFF A SPEECH PATH AND CONVERTING TO A STANDBY STATE UPON COMPLETION OF SPEAKERPHONE SPEECH IN A CORDLESS TELEPHONE

[75] Inventor: Jong-Kwang Kim, Gumi, Rep. of Korea

[73] Assignee: SamSung Electronics Co., Ltd., Kyungki-do, Rep. of Korea

[*] Notice: This patent is subject to a terminal disclaimer.

[21] Appl. No.: 08/674,846

[22] Filed: Jul. 3, 1996

[30] Foreign Application Priority Data

Jul. 4, 1995 [KR] Rep. of Korea ............. 95-19491

[51] Int. Cl.[7] ............. H04M 9/00
[52] U.S. Cl. ............. 379/389; 379/377; 379/420
[58] Field of Search ............. 379/389, 388, 379/390, 420, 432, 387, 58, 61, 164, 165, 377, 81, 67; 455/426, 403

[56] References Cited

U.S. PATENT DOCUMENTS

| | | | |
|---|---|---|---|
| 4,314,103 | 2/1982 | Wilson | 379/81 |
| 4,756,021 | 7/1988 | Nakayama | 379/388 |
| 4,790,002 | 12/1988 | D'Agosto, III et al. | 379/387 |
| 4,907,258 | 3/1990 | Kamitomo | 379/209 |
| 4,922,529 | 5/1990 | Kiel | 379/377 |
| 4,932,046 | 6/1990 | Katz et al. | 379/81 |
| 5,138,651 | 8/1992 | Sudo | 379/420 |
| 5,224,151 | 6/1993 | Bowen et al. | 379/58 |
| 5,253,287 | 10/1993 | Hasegawa | 379/67 |
| 5,276,916 | 1/1994 | Pawlish et al. | 455/89 |
| 5,297,198 | 3/1994 | Butani et al. | 379/389 |
| 5,313,514 | 5/1994 | Kanasashi | 379/58 |
| 5,379,338 | 1/1995 | Umemoto et al. | 379/58 |
| 5,396,550 | 3/1995 | Kim | 379/390 |
| 5,471,523 | 11/1995 | Smith et al. | 379/165 |
| 5,572,575 | 11/1996 | Yamamoto et al. | 379/420 |
| 5,712,911 | 1/1998 | Her | 379/377 |

FOREIGN PATENT DOCUMENTS 2154099  8/1985  United Kingdom ............. 379/81

*Primary Examiner*—Forester W. Isen
*Assistant Examiner*—Jacques M. Saint-Surin
*Attorney, Agent, or Firm*—Robert E. Bushnell, Esq.

[57] ABSTRACT

A method for performing a speakerphone function in a cordless telephone contemplates the steps of: forming a speakerphone speech path to enable the speakerphone function in response to user input of a speakerphone key, detecting a busy tone signal received from a telephone line while the speakerphone speech path is formed, and automatically interrupting the speakerphone speech path to disable the speakerphone function in response to detection of the busy tone signal. The speakerphone speech path is automatically interrupted by controlling a hook relay to disconnect the telephone line from a voice processor that transmits and receives voice signals, and controlling an electrical switch to disconnect the voice processor from a microphone that generates the voice signals from a user's speech and a speaker that aurally transmits the voice signals received from the telephone line via the voice processor.

8 Claims, 2 Drawing Sheets

CIRCUIT AND METHOD FOR AUTOMATICALLY CUTTING OFF A SPEECH PATH AND CONVERTING TO A STANDBY STATE UPON COMPLETION OF SPEAKERPHONE SPEECH IN A CORDLESS TELEPHONE

CLAIM OF PRIORITY

This application makes reference to, incorporates the same herein, and claims all benefits accruing under 35 U.S.C. §119 arising from an application for *Circuit And Method For Automatically Cutting Off A Speech Path And Converting To A Standby State Upon Completion Of Speakerphone Speech In A Cordless Telephone* earlier filed in the Korean Industrial Property Office on Jul. 4, 1995 and there duly assigned Serial No. 19491/1995.

BACKGROUND OF THE INVENTION

The present invention relates to a cordless telephone, and more particularly, to a circuit and method for cutting off a speech path and converting to a standby state in a cordless telephone when either a speakerphone key is input or a busy tone is detected during a speakerphone speech mode.

The speakerphone function has been developed to provide telephone users with the ability to engage in a hands-free telephone conversation. That is, the speakerphone is generally coupled to a telephone line and is designed to allow the user to move freely while engaging in telephonic communication with another party. One earlier effort that discusses the speakerphone function is U.S. Pat. No. 5,396,550, assigned to the same assignee as the present invention.

In many conventional cordless telephones or general telephones, if a user desires to make or receive a telephone call using the speakerphone function, the user must first depress a speakerphone key on the keypad of the telephone terminal. Upon depression of the speakerphone key, the user can engage in a conversation with another party without having to speak into the telephone handset. Further, in order to return to a standby state after completion of a telephone conversation, the user must again depress the speakerphone key so that the speech path can be cut off.

When the user engages in a telephone conversation using the speakerphone function, he or she is generally moving around the office, or is in a location away from the telephone terminal. Therefore, since the user must again press the speakerphone key to cut off the speech path when the conversation is completed, the user is subjected to the inconvenience of having to interrupt his or her current activity and move to the telephone terminal to again press the speakerphone key. Moreover, in the event that the user forgets to again press the speakerphone key, the telephone remains in a speech mode. The present invention is directed towards solving this problem.

SUMMARY OF THE INVENTION

Therefore, it is an object of the present invention to provide an improved circuit and method for performing a speakerphone function in a cordless telephone.

It is another object to provide a circuit and method for automatically cutting off a speech path and converting to a standby state when a busy tone is detected during a speakerphone speech mode in a telephone having a tone signal detector.

It is still another object to provide a circuit and method for automatically cutting off a speech path and converting to a standby state when either depression of a speakerphone key or receipt of a busy tone is detected during a speakerphone speech mode in a portable telephone.

It is yet another object to provide a circuit and method for performing a speakerphone function in a cordless telephone that minimizes the user's inconvenience.

To achieve these and other objects, the present invention provides a method for performing a speakerphone function in a cordless telephone. The method contemplates forming a speakerphone speech path to enable the speakerphone function in response to user input of a speakerphone key, detecting a tone signal received from a telephone line while the speakerphone speech path is formed, and automatically interrupting the speakerphone speech path to disable the speakerphone function in response to detection of the busy tone signal. The speakerphone speech path is automatically interrupted by controlling a hook relay to disconnect the telephone line from a voice processor that transmits and receives voice signals, and controlling an electrical switch to disconnect the voice processor from a microphone that generates the voice signals from a user's speech and a speaker that aurally transmits the voice signals received from the telephone line via the voice processor.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE INVENTION

Figure 1:
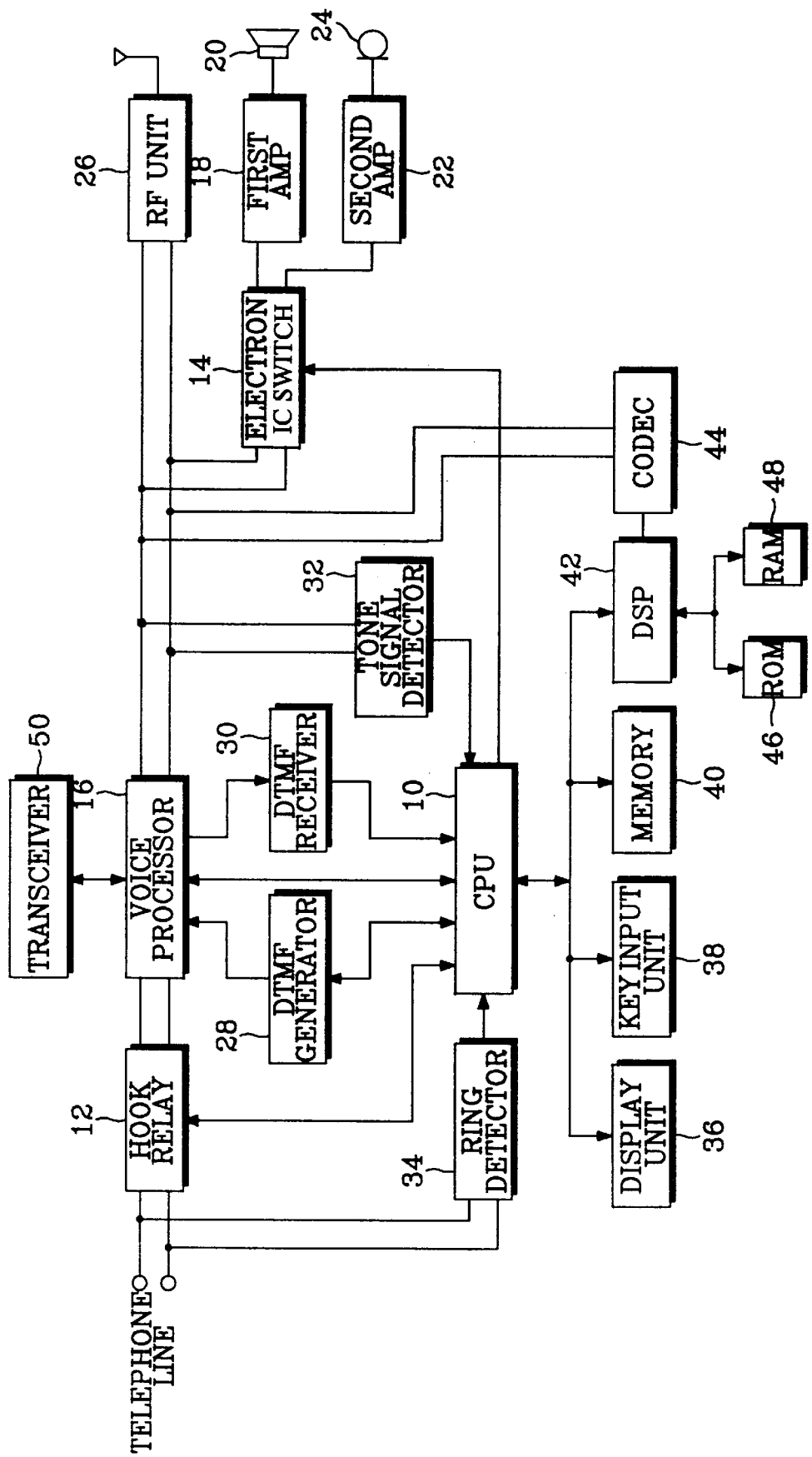
FIG. 1 illustrates a cordless telephone constructed according to the principles of the present invention.

Turning now to the drawings and referring to FIG. 1, a cordless telephone constructed according to the principles of the present invention is shown. In FIG. 1, a central processing unit (hereinafter, "CPU") 10 controls the overall operation of the cordless telephone, and accordingly controls an operation of automatically cutting off a speech path upon the completion of speakerphone speech. A hook relay 12, which includes a hook switch, connects and disconnects a telephone line with a voice processor 16 under the control of CPU 10. Hook relay 12 enables formation of a speakerphone speech path when a speakerphone key is input, and interrupts the speakerphone speech path when a busy tone is detected under the control of CPU 10. An electronic switch 14 is connected in parallel between voice processor 16 and a radio frequency (hereinafter, "RF") unit 26, and interrupts operation of a speaker 20 and a microphone 24 of the speakerphone when the busy tone is detected under the control of CPU 10. Voice processor 16 performs a voice processing operation and transmits voice signals and various tone signals to corresponding components under the control of CPU 10. A first amplifier 18 amplifies the voice signals input from electronic switch 14, and outputs the amplified voice signals to speaker 20. Speaker 20 aurally provides the amplified voice signals to a user. A second amplifier 22 amplifies the voice signals generated from the user's speech through microphone 24, and outputs the amplified voice signals to voice processor 16 through electronic switch 14. RF unit 26 is connected to voice processor 16, and transmits the tone signals and voice signals to a portable device of the cordless telephone. A dual tone multi-frequency (hereinafter, "DTMF") generator 28 is connected between voice processor 16 and CPU 10, converts digital data output from CPU 10 into DTMF signals, and outputs the converted DTMF signals to voice processor 16. A DTMF receiver 30 is connected between voice processor 16 and CPU 10, converts DTMF signals into digital data, and outputs the digital data to CPU 10. A tone signal detector 32 is connected between voice processor 16 and CPU 10, detects the various tone signals output from voice processor 16, and supplies the detected tone signals to CPU 10. A ring detector 34 is connected between the telephone line and CPU 10, detects a ring signal input through the telephone line, and provides the detected ring signal to CPU 10. A display unit 36 displays data provided from CPU 10. A key input unit 38 includes a plurality of keys, and provides to CPU 10 key data generated according to manipulation of the keys. A memory 40 stores function tables that enable performance of various functions, and may be embodied using an electrically erasable and programmable read only memory (EEPROM). A digital signal processor (hereinafter, "DSP") 42 voice-synthesizes and analyzes data input to and output from a codec 44 under the control of CPU 10. Codec 44 is connected in parallel between voice processor 16 and RF unit 26, and converts analog signals into digital data for output to DSP 42. Moreover, codec 44 converts the digital data output from DSP 42 into analog signals for output to voice processor 16. A read only memory (ROM) 46 stores the program and digital message required for the voice-synthesis and analysis performed by DSP 42, and a random access memory (RAM) 48 temporarily stores voice data processed in DSP 42. A transceiver 50 is connected to voice processor 16 and reproduces and/or transmits the voice signal during general telephone speech.

Figure 2:
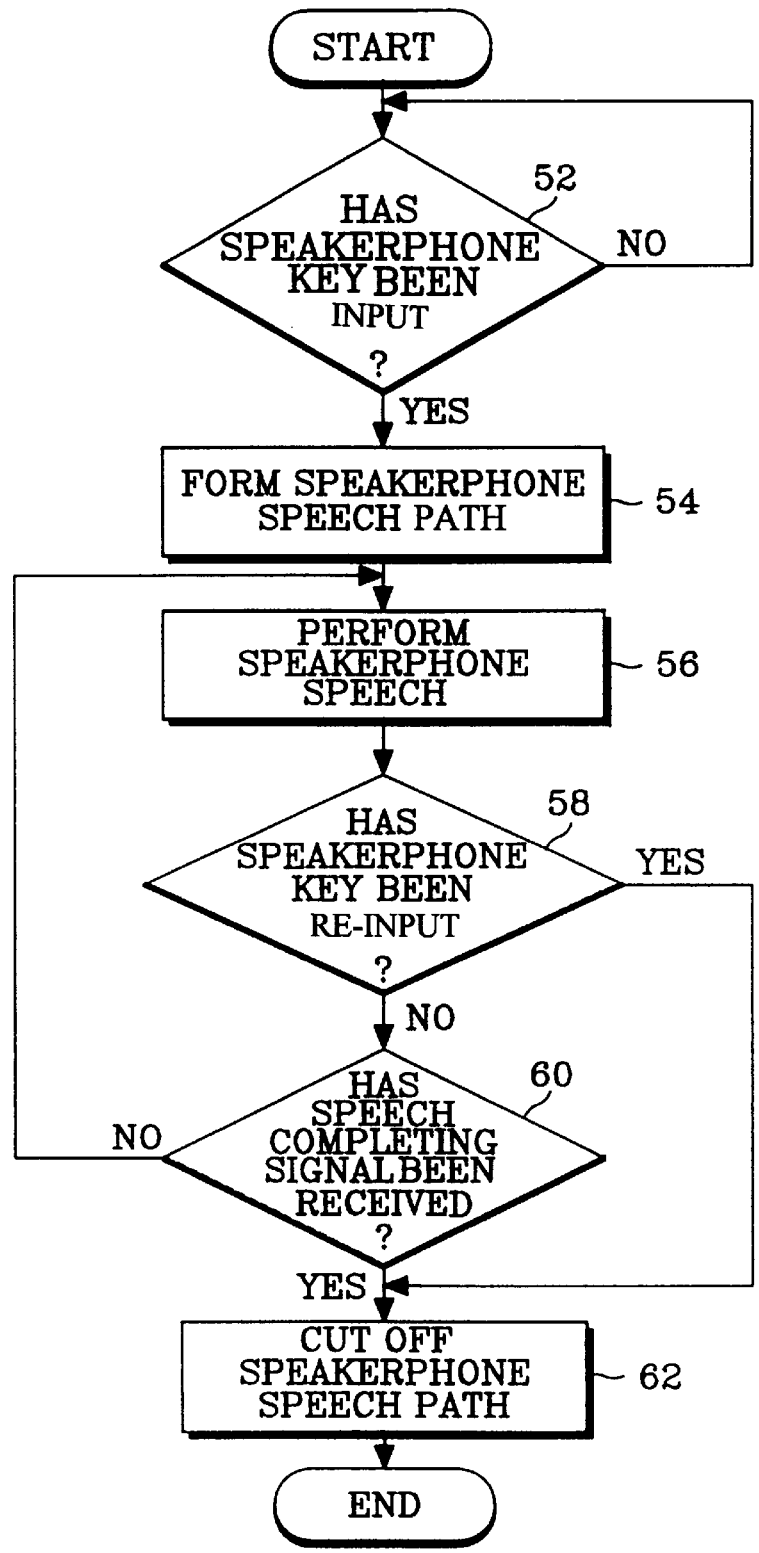
FIG. 2 illustrates a flowchart of a method for automatically cutting off a speech path and converting to a standby state upon the completion of speakerphone speech in a cordless telephone constructed according to the principles of the present invention.

FIG. 2 illustrates a flowchart of a method for automatically cutting off a speech path and converting to a standby state upon the completion of speakerphone speech in a cordless telephone constructed according to the principles of the present invention. Briefly, the method of FIG. 2 includes the steps of: determining whether or not a speakerphone key is input; operating in a speakerphone speech mode when the speakerphone key has been input; and cutting off a speech path and completing the speakerphone speech mode when either a busy tone is detected or the speakerphone key is re-input during the speakerphone speech mode.

A detailed explanation of this method will now be provided with reference to FIGS. 1 and 2.

In step 52, CPU 10 determines whether the speakerphone key is input from key input unit 38. When the speakerphone key is input, CPU 10 controls hook relay 12 and electronic switch 14 to form a speakerphone speech path, in step 54. Then, in step 56, the speakerphone speech mode is enabled and the communicating parties can perform a speakerphone speech function, in step 56. In step 58, CPU 10 determines whether the speakerphone key is re-input during the speakerphone speech mode. If the speakerphone key has been re-input, CPU 10 proceeds to step 62 and controls hook relay 12 and electronic switch 14 to thereby cut off the speech path of the speakerphone and establish a standby state. If the speakerphone key is not re-input, CPU 10 determines whether a speech completing signal (i.e., busy signal) is detected through tone signal detector 32, in step 60. Detection of the busy signal indicates that the other party has already performed an on-hook operation. In this situation, when the busy tone is detected through tone signal detector 32, CPU 10 controls hook relay 12 and electronic switch 14 in step 62 to thereby interrupt the speech path of the speakerphone and establish the standby state. Alternatively, if the busy tone is not detected through tone signal detector 32 in step 60, CPU 10 proceeds back to step 56 to enable continuous operation in the speakerphone speech mode.

As is apparent from the foregoing, the present invention has an advantage in that when a speakerphone function is completed and a busy tone is detected, the speech path is automatically cut off, so that there is no need for a user to manually re-input the speakerphone key.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for performing a speakerphone function in a cordless telephone, comprising the steps of:

forming a speakerphone speech path to enable said speakerphone function in response to user input of a speakerphone key;

detecting a busy tone signal received from a telephone line while said speakerphone speech path is formed; and automatically interrupting said speakerphone speech path to disable said speakerphone function in response to detection of said busy tone signal.

2. The method as claimed in claim 1, wherein said step of automatically interrupting said speakerphone speech path comprises the steps of:

controlling a hook relay to disconnect said telephone line from a voice processor that transmits and receives voice signals; and controlling an electrical switch to disconnect said voice processor from a microphone that generates the voice signals from a user's speech and a speaker that aurally transmits the voice signals received from said telephone line via said voice processor.

3. A circuit for providing a speakerphone function in a cordless telephone, comprising:

a voice processor connected to a telephone line for transmitting and receiving voice signals;

a microphone for providing the voice signals to said voice processor in response to user speech during execution of said speakerphone function;

a speaker for aurally providing the voice signals received from said telephone line via said voice processor during the execution of said speakerphone function;

control means for executing said speakerphone function by enabling formation of a speakerphone speech path in response to user input of a speakerphone key;

detecting means for detecting a busy tone signal from said telephone line while said speakerphone speech path is formed; and speakerphone speech path disconnection means for disconnecting said speakerphone speech path in response to detection of said busy tone signal.

4. The circuit as claimed in claim 3, wherein said speakerphone speech path disconnection means comprises:

a hook relay for disconnecting said telephone line from said voice processor; and an electronic switch for disconnecting said voice processor from said microphone and said speaker.

5. The circuit as claimed in claim 4, further comprised of said control means terminating said speakerphone function by enabling disconnection of said speakerphone speech path in response to user input of said speakerphone key while said speakerphone speech path is formed.

6. The circuit as claimed in claim 3, further comprised of said control means terminating said speakerphone function by enabling disconnection of said speakerphone speech path in response to user input of said speakerphone key while said speakerphone speech path is formed.

7. A method for performing a speakerphone function in a cordless telephone, comprising the steps of:

determining whether a speakerphone key is input by a user;

forming a speakerphone speech path to enable said speakerphone function when said speakerphone key is input by the user;

determining whether said speakerphone key is input by the user while said speakerphone speech path is formed;

determining whether a busy tone is received over a telephone line while said speakerphone speech path is formed; and automatically interrupting said speakerphone speech path to disable said speakerphone function when one of said speakerphone key is input by the user and said busy tone is received while said speakerphone speech path is formed.

8. The method as claimed in claim 7, wherein said step of automatically interrupting said speakerphone speech path comprises the steps of:

controlling a hook relay to disconnect said telephone line from a voice processor that transmits and receives voice signals; and controlling an electrical switch to disconnect said voice processor from a microphone that generates the voice signals from speech aurally provided by the user and a speaker that aurally transmits the voice signals received from said telephone line via said voice processor to the user.

* * * * *